(12) United States Patent
Zhou et al.

(10) Patent No.: US 10,696,426 B2
(45) Date of Patent: Jun. 30, 2020

(54) MENU-TYPE DESIGN METHOD FOR GEO SATELLITE CONTROL SYSTEM BASED ON OPTIMIZED INFORMATION INTEGRATION

(71) Applicant: CHINA ACADEMY OF SPACE TECHNOLOGY, Beijing (CN)

(72) Inventors: Zhicheng Zhou, Beijing (CN); Baoxiang Sun, Beijing (CN); Qiang Wei, Beijing (CN); Guixing Cao, Beijing (CN); Xiaodong Han, Beijing (CN); Tingrong Guo, Beijing (CN); Zhenjiang Cui, Beijing (CN); Jianjun Gong, Beijing (CN)

(73) Assignee: CHINA ACADEMY OF SPACE TECHNOLOGY, Beijing (CN)

( * ) Notice: Subject to any disclaimer, the term of this patent is extended or adjusted under 35 U.S.C. 154(b) by 288 days.

(21) Appl. No.: 15/765,654

(22) PCT Filed: Feb. 3, 2016

(86) PCT No.: PCT/CN2016/073359
§ 371 (c)(1),
(2) Date: Apr. 3, 2018

(87) PCT Pub. No.: WO2017/071140
PCT Pub. Date: May 4, 2017

(65) Prior Publication Data
US 2018/0281991 A1  Oct. 4, 2018

(30) Foreign Application Priority Data
Oct. 30, 2015  (CN) .......................... 2015 1 0729488

(51) Int. Cl.
*B64G 1/28* (2006.01)
*G01C 21/18* (2006.01)
(Continued)

(52) U.S. Cl.
CPC ................ *B64G 1/288* (2013.01); *B64G 1/36* (2013.01); *B64G 1/361* (2013.01); *B64G 1/363* (2013.01);
(Continued)

(58) Field of Classification Search
CPC .......... B64G 1/288; B64G 1/36; B64G 1/361; B64G 1/363; B64G 1/365; B64G 2001/245; G01C 21/18; G01C 21/24; H04B 7/18519
See application file for complete search history.

(56) References Cited

U.S. PATENT DOCUMENTS 3,340,531 A * 9/1967 Kefalas .................. H04B 7/195
                                                      342/353
3,359,407 A * 12/1967 Paige ....................... G06G 7/70
                                                      701/531
(Continued)

FOREIGN PATENT DOCUMENTS

CN         102494687 A      6/2012
CN         102661751 A      9/2012
(Continued)

OTHER PUBLICATIONS

Chen et al., "Application of Multi-sensor Information Fusion in Satellite Attitude Determination System", Aerospace Control, vol. 23, No. 3, Jun. 30, 2005 (Jun. 30, 2005), ISSN: 1006-324, pp. 35-38.
(Continued)

*Primary Examiner* — Medhat Badawi
(74) *Attorney, Agent, or Firm* — Harness, Dickey & Pierce, P.L.C.

(57) ABSTRACT

A menu-type design method based on optimized information fusion applied to a GEO satellite control system is provided, which includes: configuring four long-life inertial attitude sensor gyroscopes for a long-life GEO satellite control
(Continued)

system; configuring sensors capable of measuring three-axis attitude according to a menu-type design requirement on hardware, where the long-life inertial attitude sensor gyroscopes and the sensors capable of measuring three-axis attitude are combined to form three types of Kalman filters; autonomously sorting, by the satellite-borne computer application software, the Kalman filters; and in a case where an FDIR module detects a fault, autonomously generating, by the FDIR module, an alarm corresponding to the fault, and autonomously performing, by a currently selected Kalman filter, reduced-order filtering, and in a case where the fault is not eliminated within a set time period, issuing, by the FDIR module, a macro instruction sequence to perform autonomous reorganization.

8 Claims, 2 Drawing Sheets

(51) Int. Cl.
B64G 1/36 (2006.01)
G01C 21/24 (2006.01)
B64G 1/24 (2006.01)
(52) U.S. Cl.
CPC ............ *B64G 1/365* (2013.01); *G01C 21/18* (2013.01); *G01C 21/24* (2013.01); *B64G 2001/245* (2013.01)

(56) References Cited

U.S. PATENT DOCUMENTS

| | | | | |
|---|---|---|---|---|
| 3,490,719 A * | 1/1970 | Volpe | B64G 1/288 244/169 |
| 3,643,897 A * | 2/1972 | Johnson, Jr. | B64G 1/26 244/169 |
| 4,174,819 A * | 11/1979 | Bruderle | B64G 1/244 244/169 |
| 4,730,798 A * | 3/1988 | Wertz | B64G 1/24 244/164 |
| 4,807,835 A * | 2/1989 | Fowler | B64G 1/244 244/166 |
| 5,204,818 A * | 4/1993 | Landecker | B64G 1/36 244/164 |
| 5,439,190 A * | 8/1995 | Horstein | B64G 1/1007 455/12.1 |
| 5,452,077 A * | 9/1995 | Green | G01C 21/24 244/171 |
| 5,528,502 A * | 6/1996 | Wertz | B64G 1/24 701/13 |
| 5,562,266 A * | 10/1996 | Achkar | B64G 1/24 244/171 |
| 5,642,122 A * | 6/1997 | Lockie | H01Q 25/00 343/881 |
| 5,687,084 A * | 11/1997 | Wertz | B64G 1/24 701/13 |
| 5,697,050 A * | 12/1997 | Wiedeman | B64G 1/24 455/12.1 |
| 5,794,891 A * | 8/1998 | Polle | B64G 1/24 244/164 |
| 5,931,421 A * | 8/1999 | Surauer | B64G 1/24 244/165 |
| 5,951,609 A * | 9/1999 | Hanson | B64G 1/24 244/158.8 |
| 5,984,236 A * | 11/1999 | Keitel | B64G 1/24 244/164 |
| 6,082,677 A * | 7/2000 | Kikuchi | B64G 1/1021 244/158.4 |
| 6,102,335 A * | 8/2000 | Castiel | B64G 1/1007 244/158.4 |
| 6,128,555 A * | 10/2000 | Hanson | B64G 1/24 244/158.1 |
| 6,211,817 B1 * | 4/2001 | Eschenbach | G01S 19/07 342/357.31 |
| 6,240,367 B1 * | 5/2001 | Lin | G01C 21/28 342/357.31 |
| 6,272,432 B1 * | 8/2001 | Li | B64G 1/288 701/501 |
| 6,285,927 B1 * | 9/2001 | Li | B64G 1/24 701/13 |
| 6,328,264 B1 * | 12/2001 | Maeda | B64G 1/1007 244/158.4 |
| 6,356,815 B1 * | 3/2002 | Wu | B64G 1/361 701/13 |
| 6,408,245 B1 * | 6/2002 | An | G01C 21/165 340/450 |
| 6,559,793 B1 * | 5/2003 | Eschenbach | G01S 19/07 342/357.31 |
| 6,577,929 B2 * | 6/2003 | Johnson | B64G 1/36 244/165 |
| 6,681,159 B2 * | 1/2004 | Li | B64G 1/28 701/13 |
| 6,685,142 B1 * | 2/2004 | Fichter | B64G 1/244 244/171 |
| 6,691,033 B1 * | 2/2004 | Li | B64G 1/361 244/164 |
| 6,757,858 B1 * | 6/2004 | Flammang | H04B 7/18597 370/316 |
| 6,764,049 B1 * | 7/2004 | Maeda | B64G 1/1007 244/158.4 |
| 6,859,727 B2 * | 2/2005 | Bye | G01C 21/165 701/510 |
| 6,945,500 B2 * | 9/2005 | Wingo | B64G 1/1078 244/159.4 |
| 7,248,948 B2 * | 7/2007 | Shiho | B64G 1/288 244/171 |
| 7,357,356 B1 * | 4/2008 | Goodzeit | B64G 1/283 244/164 |
| 7,370,566 B2 * | 5/2008 | Furman | B64G 1/1085 244/158.4 |
| 7,460,063 B2 * | 12/2008 | De Maagt | G01S 13/89 342/351 |
| 7,676,305 B2 * | 3/2010 | Potteck | B64G 1/361 244/164 |
| 9,696,408 B2 * | 7/2017 | Eikenberry | G01S 5/163 |
| 9,745,083 B2 * | 8/2017 | Smith | B64G 1/66 |
| 9,791,278 B2 * | 10/2017 | McCroskey | B64G 1/36 |
| 9,973,266 B1 * | 5/2018 | Avellan | H04B 7/024 |
| 10,557,980 B2 * | 2/2020 | Jungwirth | G01S 3/7867 |
| 2002/0186165 A1 * | 12/2002 | Eschenbach | G01S 19/09 342/357.46 |
| 2003/0034422 A1 * | 2/2003 | Higgins | B64G 1/1007 244/158.4 |
| 2003/0149529 A1 * | 8/2003 | Heatwole | B64G 1/283 701/501 |
| 2005/0021378 A1 * | 1/2005 | Weinstock | G06Q 10/02 705/5 |
| 2005/0103941 A1 * | 5/2005 | Ebert | B64G 1/24 244/164 |
| 2006/0118677 A1 * | 6/2006 | Goodzeit | B64G 1/1007 244/164 |
| 2008/0046138 A1 * | 2/2008 | Fowell | B64G 1/244 701/13 |
| 2008/0059474 A1 * | 3/2008 | Lim | G06F 21/604 |
| 2008/0087769 A1 * | 4/2008 | Johnson | B64G 1/281 244/166 |
| 2008/0091738 A1 * | 4/2008 | Devraj | G06F 16/217 |
| 2008/0155499 A1 * | 6/2008 | Dravnieks | G06F 9/45508 717/107 |
| 2008/0243756 A1 * | 10/2008 | Moon | G06Q 30/02 |
| 2008/0313488 A1 * | 12/2008 | Jeong | H04B 7/18519 714/2 |
| 2011/0297794 A1 * | 12/2011 | Johnson | B64G 1/281 244/165 |
| 2012/0053780 A1 * | 3/2012 | Park | B64G 1/24 701/29.7 |
| 2014/0199051 A1 * | 7/2014 | Engeli | H04N 21/4147 386/296 |

(56) References Cited

U.S. PATENT DOCUMENTS

| | | | | |
|---|---|---|---|---|
| 2014/0316615 | A1* | 10/2014 | Shue | G05D 1/0077 |
| | | | | 701/3 |
| 2016/0065006 | A1* | 3/2016 | Woods | H02J 50/23 |
| | | | | 307/84 |
| 2016/0239068 | A1* | 8/2016 | Varma | G06F 1/3206 |
| 2016/0353022 | A1* | 12/2016 | Mueller | A61B 5/6889 |
| 2017/0065232 | A1* | 3/2017 | Lane | A61B 5/7435 |
| 2017/0160749 | A1* | 6/2017 | Torralba | B64C 13/18 |

FOREIGN PATENT DOCUMENTS

| | | |
|---|---|---|
| CN | 103134491 A | 6/2013 |
| CN | 103264776 A | 8/2013 |
| CN | 105253330 A | 1/2016 |

OTHER PUBLICATIONS

Wang et al., "Research on Information Fusion Method for Satellite Attitude Determination Based on Multi-Sensor Measurement", Aerospace Shanghai, No. 6, Jun. 2009 (Jun. 30, 2009), ISSN: 1006-163. pp. 1-7.

International Search Report for PCT/CN2016/073359, ISA/CN, Haidian District, Beijing, dated Jul. 28, 2016, with English translation.

Written Opinion of the ISA for PCT/CN2016/073359, ISA/CN, Haidian District, Beijing, dated Jul. 28, 2016 (in Chinese).

Cao, et al., "Application of Multi-Sensors Data Fusion Based on Improved Federal Filtering in Micro-Satellite Attitude Determination," 2011 International Workshop on Multi-Platform/Multi-Sensor Remote Sensing and Mapping; Xiamen, China; Jan. 10-12, 2011.

European Search Report regarding PCT/CN2016/073359 dated May 24, 2019.

* cited by examiner

MENU-TYPE DESIGN METHOD FOR GEO SATELLITE CONTROL SYSTEM BASED ON OPTIMIZED INFORMATION INTEGRATION

This application is the national phase of International Application No. PCT/CN2016/073359, titled "MENU-TYPE DESIGN METHOD FOR GEO SATELLITE CONTROL SYSTEM BASED ON OPTIMIZED INFORMATION INTEGRATION", filed on Feb. 3, 2016, which claims priority to Chinese Patent Application No. 201510729488.6, titled "MENU-TYPE DESIGN METHOD FOR GEO SATELLITE CONTROL SYSTEM BASED ON OPTIMIZED INFORMATION INTEGRATION", filed with the Chinese State Intellectual Property Office on Oct. 30, 2015, which are incorporated herein by reference in their entireties.

FIELD

The present disclosure relates to the technical field of spacecraft control, and in particular to a menu-type design method based on optimized information fusion applied to a GEO satellite control system.

BACKGROUND

Since a geostationary earth orbit (GEO) satellite is launched and positioned at a much higher cost than a middle and low orbit satellite, it is required to prolong the service life of the GEO satellite. At present, the GEO satellite generally has a service life longer than 15 years, which places a high demand on the anti-radiation performance of a satellite-borne computer. In addition, the satellite-borne computer generally operates at a frequency lower than the rated value in order to ensure reliability. However, the computational capability of the satellite-borne computer is also reduced. In order to increase the precision in attitude determination and attitude control, as well as shorten sampling periods in filtering and controlling, a long-life GEO satellite computer operates with a higher load than the middle and low orbit satellite-borne computer. Therefore, a costly anti-radiation high-performance chip becomes a critical component of the long-life GEO satellite computer.

Information fusion is a process for processing measurement data from multiple sensors or transducers in a multi-level and multifaceted manner. An information fusion scheme based on federal Kalman filtering where multiple sub-filters are used in combination with a main is proposed in some papers relating to information fusion. However, the information fusion scheme is suitable for only the computer in the middle and low orbit spacecraft which has a service life of 3 to 5 years. If the information fusion scheme is applied to the long-life GEO satellite, the long-life GEO satellite may be overloaded. In addition, for the GEO satellite, backup is increased if all redundant attitude sensors operate simultaneously, resulting in a reduced cost-to-performance ratio and a reduced load-to-dry weight ratio (a ratio of load weight to dry weight of the satellite). In addition, with the same configuration, a failure rate is increased and reliability is reduced if all redundant attitude sensors operate in parallel.

At present, a software design of a control system for a long-life GEO satellite platform is usually a weak point that affects the progress of development. Therefore, there is an urgent need to address the issues as to how to realize information fusion for the GEO satellite, and how to achieve optimized information fusion by combining sensors and gyroscopes are urgent issues to be solved.

At present, there is no paper or patent which deals with research in this field.

SUMMARY

A technical issue to be solved by the present disclosure is to propose a menu-type design method based on optimized information fusion applied to a GEO satellite control system, with which disadvantages in the conventional technology can be overcome. According to the present disclosure, information fusion with moderate redundancy where long-life inertial attitude sensor gyroscopes are fully utilized is combined with satellite-borne autonomous FDIR (fault detection, isolation, and reorganization) software to implement a software control system with a menu-type design, with which a high cost-to-performance ratio, a high load-to-dry weight ratio and high reliability are ensured, and a developing cycle can be significantly shortened.

The following technical solutions are provided according to the present disclosure.

A menu-type design method based on optimized information fusion applied to a GEO satellite control system is provided, which include:

step (1), configuring four long-life inertial attitude sensor gyroscopes for a long-life GEO satellite control system, where the four long-life inertial attitude sensor gyroscopes are configured in a pyramid type layout, three of the four gyroscopes are configured for Kalman filtering, the other one of the four gyroscopes is configured for cold backup, and measurement values outputted by each of the gyroscopes during normal operation includes attitude angle components and attitude angular velocity components along three axes;

step (2), configuring sensors required by a user according to a menu-type design requirement on hardware, where an optical attitude sensor, a star sensor, an earth sensor, a sun sensor and other types of sensor capable of measuring three-axis attitude with required attitude measurement accuracy are configured for the long-life GEO satellite control system, the long-life inertial attitude sensor gyroscopes and the optical attitude sensor; the star sensor; the earth sensor, the sun sensor and other types of sensor capable of measuring three-axis attitude are combined by satellite-borne computer application software to form three types of Kalman filters, each of which is capable of independently determining attitude, acquiring attitude measurement redundancy information, autonomously performing calibration, and autonomously performing compensation of angular velocity constant drift of the gyroscope;

(3) filling a two out of three hardware configuration table, a main operation state table, a backup operation state table and a health word in the satellite-borne computer application software based on the configured sensors, and autonomously sorting, by the satellite-borne computer application software on initialization; the three types of Kalman filters acquired in step (2) in the following order: the three inertial attitude sensor gyroscopes in combination with the optical attitude star sensor, the three inertial attitude sensor gyroscopes in combination with the earth sensor and the sun sensor, and the three inertial attitude sensor gyroscopes in combination with other types of sensor capable of measuring three-axis attitude; and (4) in a case where an FDIR module in the satellite-borne computer application software detects a fault, which includes the optical attitude sensor being interfered by sun light or moon light, being shadowed or being subject to other failures within a short period of time, or one of the long-life inertial attitude sensor gyroscopes being failed, autonomously generating; by the FDIR module, an alarm corresponding to the fault, and autonomously performing, by a currently selected Kalman filter, reduced-order filtering, and in a case where the fault is not eliminated within a set time period, issuing, by the FDIR module, a macro instruction sequence, to implement autonomous reorganization (which includes autonomously starting a health sensor configured for cold backup or starting a next layer of filter), to ensure attitude determination performance of the control system.

The present disclosure has the following beneficial effects as compared with the conventional technology.

(1) With the menu-type design method based on optimized information fusion applied to a long-life (longer than 15 years) GEO satellite control system, information fusion with moderate redundancy where the long-life inertial attitude sensor gyroscopes are fully utilized is combined with a satellite-borne autonomous FDIR (fault detection, isolation, and reorganization) module to implement a control system with a menu-type design. The present disclosure can be applied to a long-life inclined synchronous orbit satellite and a long-life medium and low orbit spacecraft. The disclosure has high versatility and industrial applicability, and fills the gap in the field at home and abroad. The technical solution according to the present disclosure is in a leading position in the world and is internationally competitive.

(2) According to the present disclosure, the long-life inertial attitude sensor gyroscopes are arranged in a pyramid type layout. Measurement values of each of the gyroscopes include attitude angle components and attitude angular velocity components along three axes. Therefore, the ability of the three types of Kalman filters to autonomously perform reduced-order filtering is improved, thereby improving the cost-to-performance ratio, the load-to-dry weight ratio and the reliability of the GEO satellite platform and significantly shortening the developing cycle. In addition, the load on the GEO satellite computer is reduced, thus the requirement on a chip in the GEO satellite computer is reduced.

DETAILED DESCRIPTION OF EMBODIMENTS

The operation principle and operation process according to the present disclosure are further described below with reference to the accompanying drawings.

Figure 1:
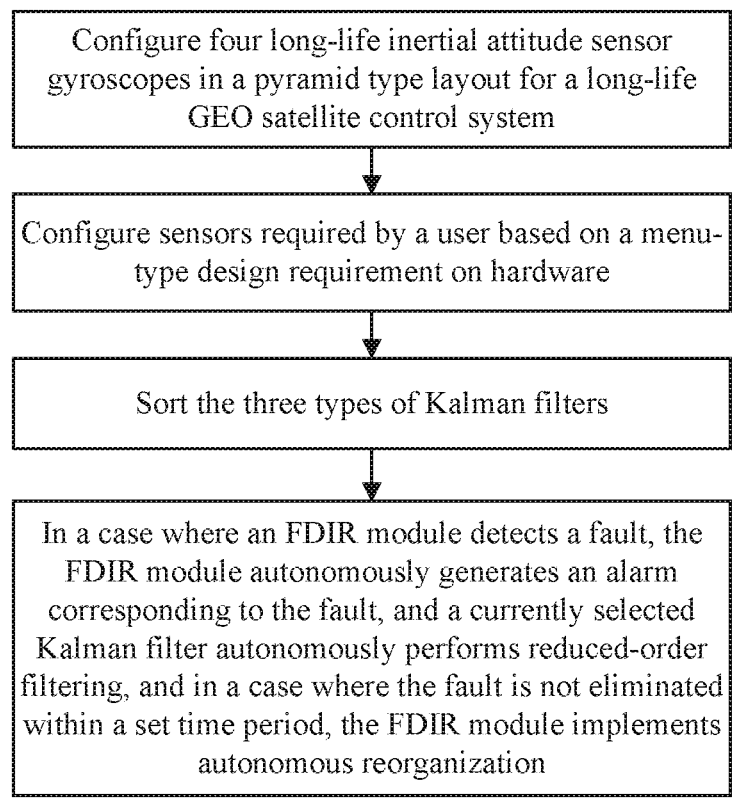
FIG. 1 is a flowchart of a method according to the present disclosure.

As shown in FIG. 1, a menu-type design method based on optimized information fusion applied to a GEO satellite control system includes the following steps (1) to (4).

In step (1), four long-life inertial attitude sensor gyroscopes are configured for a long-life GEO satellite control system. The four long-life inertial attitude sensor gyroscopes are configured in a pyramid type layout, three of the four gyroscopes are configured for Kalman filtering, the other one of the four gyroscopes is configured for cold backup, and measurement values outputted by each of the gyroscopes during normal operation includes attitude angle components and attitude angular velocity components along three axes.

Figure 2:
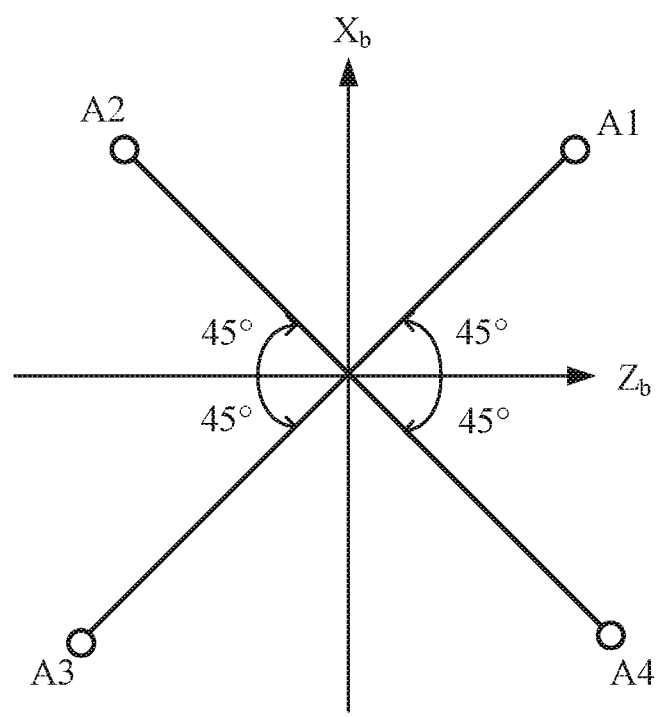
FIG. 2 is a schematic diagram of a pyramid type layout according to the present disclosure.

As shown in FIG. 2, four gyroscopes (A1, A2, A3 and A4) are arranged in a symmetrical pyramid type layout, in which any one of the three axes of a satellite body coordinate system is taken as the symmetry axis, a measurement axis of each of the gyroscopes is at an angle θ (which can be any value) with respect to the symmetry axis, and angles of a projection of the measurement axis of each gyroscope in a plane formed by two axes of the three axes of the satellite body coordinate system other than the symmetry axis with respect to the two axes are 45°.

In step (2), sensors required by a user are configured according to a menu-type design requirement on hardware. An optical attitude sensor, a star sensor, an earth sensor, a sun sensor and other types of sensor capable of measuring three-axis attitude (such as a radio-frequency sensor, a navigation satellite system-based receiver which has four antennas and determines an orbit and attitude autonomously) with required attitude measurement accuracy are configured for the long-life GEO satellite control system. The long-life inertial attitude sensor gyroscopes and the optical attitude sensor, the star sensor, the earth sensor, the sun sensor and other types of sensor capable of measuring three-axis attitude are combined by satellite-borne computer application software to form three types of Kalman filters, each of which is capable of independently determining attitude, acquiring attitude measurement redundancy information, autonomously performing calibration, and autonomously performing compensation of angular velocity constant drift of the gyroscope.

In step (3), a two out of three hardware configuration table, a main operation state table, a backup operation state table and a health word in the satellite-borne computer application software are filled based on the configured sensors. The satellite-borne computer application software autonomously sorts the three types of Kalman filters acquired in step (2) in the following order on initialization: the three inertial attitude sensor gyroscopes in combination with the optical attitude star sensor, the three inertial attitude sensor gyroscopes in combination with the earth sensor and the sun sensor, and the three inertial attitude sensor gyroscopes in combination with other types of sensor capable of measuring three-axis attitude (The sensors to be sorted are selected based on user requirements).

In step (4), in a case where an FDIR module in the satellite-borne computer application software detects a fault, which includes the optical attitude sensor being interfered by sun light or moon light, being shadowed or being subject to other failures within a short to period of time, or one of the long-life inertial attitude sensor gyroscopes being failed, the FDIR module autonomously generates an alarm corresponding to the fault, and a currently selected Kalman filter autonomously performs reduced-order filtering. In a case where the fault is not eliminated within a set time period, the FDIR module issues a macro instruction sequence to implement autonomous reorganization (which includes autonomously starting a health sensor configured for cold backup or starting a next layer of filter), to ensure attitude determination performance of the control system. A small random drift of the gyroscope corresponds to a small pulse equivalency and a long time interval allowed for reorganization. Starting of the next layer of filter causes small influence on attitude determination and attitude control performance since error in initial attitude determination is small, and filtering converges rapidly.

Generally, a GEO satellite with high precision requirements on attitude determination and attitude control is configured with a star sensor. Therefore, a single Kalman filter including a gyroscope and a star sensor is a first choice. Attitude sensors can be configured for the GEO satellite control system with the menu-type design method based on different requirements on performance from different users. In a case where the user has a low requirement on the attitude control performance, the hardware configuration may not include the star sensor, and the single Kalman filter including the gyroscope, the earth sensor and the sun sensor may be autonomously set as a first choice, where precision in attitude determination and attitude control can be no less than or better than that in the case where the attitude is determined by the star sensor individually. That is, the two out of three hardware configuration table, the main operation state stable, the backup operation state stable and the health word in the satellite-borne computer application software are filled based on the actual configuration. The single Kalman filters, which are selectable, are sorted autonomously after the satellite-borne computer is started and initialized. However, ground remote control has the priority to modify the order in which the Kalman filers are sorted and determine which Kalman filter is the Kalman filter of the first layer.

The contents which are not described in detail in the description of the present disclosure are well known to those skilled in the aerospace field.

The invention claimed is:

1. A menu design method based on optimized information fusion applied to a GEO satellite control system, comprising:
    step (1), configuring four long-life inertial attitude sensor gyroscopes for a long-life GEO satellite control system, wherein three of the four gyroscopes are configured for Kalman filtering, the other one of the four gyroscopes is configured for cold backup, and measurement values outputted by each of the gyroscopes during normal operation comprises attitude angle components and attitude angular velocity components along three axes;
    step (2), configuring sensors required by a user according to a menu design requirement on hardware, wherein sensors capable of measuring three-axis attitude with required attitude measurement accuracy are configured for the long-life GEO satellite control system, the long-life inertial attitude sensor gyroscopes and the sensors capable of measuring three-axis attitude are combined by satellite-borne computer application software to form three categories of Kalman filters, each of which is capable of independently determining attitude, acquiring attitude measurement redundancy information, autonomously performing calibration, and autonomously performing compensation of angular velocity constant drift of the gyroscope;
    step (3), filling a two out of three hardware configuration table, a main operation state table, a backup operation state table and a health word in the satellite-borne computer application software based on the configured sensors, and autonomously sorting, by the satellite-borne computer application software on initialization, the Kalman filters acquired in step (2); and
    step (4) when a fault detection, isolation, and reorganization (FDIR) module in the satellite-borne computer application software detects a fault, wherein an optical attitude sensor is interfered with by sun light or moon light, is shadowed or is subject to other failures within a short period of time, or one of the long-life inertial attitude sensor gyroscopes is failed, autonomously generating, by the FDIR module, an alarm corresponding to the fault, and autonomously performing, by a currently selected Kalman filter, reduced-order filtering, and, when the fault is not eliminated within a set time period, issuing, by the FDIR module, a macro instruction sequence, to implement autonomous reorganization, to ensure attitude determination performance of the control system.

2. The menu design method based on optimized information fusion applied to a GEO satellite control system according to claim 1, wherein the sensors capable of measuring three-axis attitude with required attitude measurement accuracy configured in step (2) comprises an inertial attitude sensor, an optical attitude sensor and other categories of sensors capable of measuring three-axis attitude, and the optical attitude sensor comprises a star sensor, an earth sensor and a sun sensor.

3. The menu design method based on optimized information fusion applied to a GEO satellite control system according to claim 2, wherein the three categories of Kalman filters are sorted in step (3) in the following order: the three inertial attitude sensor gyroscopes in combination with the star sensor, the three inertial attitude sensor gyroscopes in combination with the earth sensor and the sun sensor, and the three inertial attitude sensor gyroscopes in combination with other categories of sensors capable of measuring three-axis attitude.

4. The menu design method based on optimized information fusion applied to a GEO satellite control system according to claim 3, wherein the performing autonomous reorganization in step (4) comprises autonomously starting a health sensor configured for cold backup or starting a next layer of filter.

5. The menu design method based on optimized information fusion applied to a GEO satellite control system according to claim 4, wherein the starting the next layer of filter comprising selecting the Kalman filter in the order in which the three categories of Kalman filters are sorted.

6. The menu design method based on optimized information fusion applied to a GEO satellite control system according to claim 1, wherein the long-life indicates a life longer than or equal to 15 years.

7. The menu design method based on optimized information fusion applied to a GEO satellite control system according to claim 1, wherein in step (1), the four long-life inertial attitude sensor gyroscopes for the long-life GEO satellite control system are configured in a pyramid layout in which any one of three axes of a satellite body coordinate system is taken as a symmetry axis, and a measurement axis of each of the four gyroscopes is at an angle θ with respect to the symmetry axis.

8. The menu design method based on optimized information fusion applied to a GEO satellite control system according to claim 7, wherein the angle θ takes any value.

* * * * *